(12) United States Patent
Chou et al.

(10) Patent No.: US 12,416,846 B2
(45) Date of Patent: Sep. 16, 2025

(54) ELECTRONIC DEVICE

(71) Applicant: Lenovo (Beijing) Limited, Beijing (CN)

(72) Inventors: Chiehyen Chou, Beijing (CN); Shoujin Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 66 days.

(21) Appl. No.: 18/464,739

(22) Filed: Sep. 11, 2023

(65) Prior Publication Data

US 2024/0111205 A1  Apr. 4, 2024

(30) Foreign Application Priority Data

Sep. 30, 2022  (CN) .......................... 202211206822.6

(51) Int. Cl.
G03B 17/02 (2021.01)
(52) U.S. Cl.
CPC .................................... G03B 17/02 (2013.01)
(58) Field of Classification Search
None
See application file for complete search history.

(56) References Cited

U.S. PATENT DOCUMENTS

| | | | | |
|---|---|---|---|---|
| 6,704,586 B2 * | 3/2004 | Park | .................... | H04M 1/0264 348/E7.079 |
| 6,879,337 B2 * | 4/2005 | Tatehana | ............. | H04M 1/0218 348/E5.025 |
| 6,882,726 B2 * | 4/2005 | Kim | ........................ | H04N 7/142 348/E7.079 |
| 7,046,287 B2 * | 5/2006 | Nishino | .............. | H04M 1/0218 348/E7.079 |
| 7,184,803 B2 * | 2/2007 | Wu | ...................... | H04M 1/0264 455/575.4 |
| 7,369,178 B2 * | 5/2008 | Cho | ........................ | H04N 7/142 348/E7.079 |
| 7,418,280 B2 * | 8/2008 | Lee | ......................... | H04N 23/54 348/E5.025 |
| 7,477,315 B2 * | 1/2009 | Shin | ....................... | H04N 23/51 348/E5.026 |
| 7,522,946 B2 * | 4/2009 | Im | ........................ | H04M 1/0218 455/575.1 |
| 7,586,538 B2 * | 9/2009 | Cho | ..................... | H04M 1/0264 455/66.1 |
| 7,729,720 B2 * | 6/2010 | Suh | ...................... | H04M 1/0218 455/90.3 |
| 7,847,860 B2 * | 12/2010 | Kim | .................... | H04M 1/0218 455/575.1 |

(Continued)

*Primary Examiner* — Rodney E Fuller
(74) *Attorney, Agent, or Firm* — ANOVA LAW GROUP, PLLC (57) ABSTRACT

An electronic device includes: a first body; a shaft assembly disposed at the first body and including a shaft body; a second body connected to the first body through the shaft assembly and configured to rotate relative to the first body; and a camera movably disposed inside the shaft body. An axis of a lens of the camera and an axis shaft body satisfy a perpendicular condition. The camera is configured to move relative to the shaft body to switch between: a first configuration in which the camera is retracted in the shaft body, and a second configuration in which the camera extends from an axial end of the shaft body and the lens is located outside the shaft body.

9 Claims, 6 Drawing Sheets

(56) References Cited

U.S. PATENT DOCUMENTS

| | | | |
|---|---|---|---|
| 2004/0023684 A1* | 2/2004 | Sato | H04M 1/0264 455/575.1 |
| 2004/0107537 A1* | 6/2004 | Ahn | H04M 1/0243 16/221 |
| 2004/0110541 A1* | 6/2004 | Choo | H04N 7/142 455/566 |
| 2004/0198433 A1* | 10/2004 | Lee | H04N 23/54 348/E5.025 |
| 2004/0245342 A1* | 12/2004 | Cho | H04N 23/55 348/E7.079 |
| 2005/0026659 A1* | 2/2005 | Yang | H04M 1/0264 455/575.1 |
| 2005/0186996 A1* | 8/2005 | Pan | H04M 1/0218 455/575.1 |
| 2005/0200740 A1* | 9/2005 | Kim | H04M 1/0264 348/E5.025 |
| 2006/0124746 A1* | 6/2006 | Kim | G06K 19/077 235/472.02 |
| 2018/0292866 A1* | 10/2018 | Tucker | G06F 1/1694 |

* cited by examiner

ELECTRONIC DEVICE

CROSS-REFERENCE TO RELATED APPLICATION

This application claims priority to Chinese Patent Application No. 202211206822.6, filed on Sep. 30, 2022, and the entire content of which is incorporated herein by reference.

TECHNICAL FIELD

The present disclosure relates to the technical field of electronic device technology, more particularly, to an electronic device.

BACKGROUND

Currently, an electronic device is usually equipped with a camera. However, how to minimize a spatial impact of the camera on other main components such as a screen while meeting usage requirements has always been a problem that needs to be solved by those skilled in the art.

SUMMARY

One aspect of the present disclosure provides an electronic device. The electronic device includes: a first body; a shaft assembly disposed at the first body and including a shaft body; a second body connected to the first body through the shaft assembly and configured to rotate relative to the first body; and a camera movably disposed inside the shaft body. An axis of a lens of the camera and an axis shaft body satisfy a perpendicular condition. The camera is configured to move relative to the shaft body to switch between: a first configuration in which the camera is retracted in the shaft body, and a second configuration in which the camera extends from an axial end of the shaft body and the lens is located outside the shaft body.

Reference numerals in the drawings include 1. First body; 2. Second body; 21. Hollow area; 3. Shaft assembly; 4. Cylinder; 41. First protrusion; 5. Rod; 511. First guide slot a; 512. First guide slot b; 521. Second guide slot a; 522. Second guide slot b; 6. Camera; 61. Lens; 7. Drive assembly; 71. Electric motor; 72. Drive shaft; 721. Second protrusion a; and 722. Second protrusion b.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The present disclosure provides an electronic device with a reasonable camera layout, which is beneficial to reduce a space impact of the camera on other components such as a screen.

As shown in FIGS. 1-12, the present disclosure provides an electronic device. The electronic device includes a first body 1, a second body 2, and a shaft assembly 3. The second body 2 is connected to the first body 1 through the shaft assembly 3, and is rotatable relative to the first body 1. A camera 6 is rotatably disposed at a shaft body of the shaft assembly 3. The shaft body is relatively fixed to either of the first body 1 and the second body 2. An axis of a lens 61 of the camera 6 and an axis of the shaft body satisfy a perpendicular condition. That is, the axis of the lens 61 of the camera 6 is perpendicular or substantially perpendicular to the axis of the shaft body. For example, an angle between the two axes is 90±5°. The camera 6 is movable relative to the shaft body to switch between a first configuration and a second configuration. When switching from the first configuration to the second configuration, the camera 6 extends out from an axial end of the shaft body, such that the lens 61 is located outside the shaft body. When switching from the second configuration to the first configuration, the camera 6 retracts into the shaft body. In other words, the camera 6 is disposed at the shaft body that connects the first body 1 and the second body 2, and extends out of and retracts from one axial end of the shaft body. When the camera 6 extends outward, the lens 61 is located outside the shaft body to satisfy an image photographing or video shooting requirement. Further, because the camera 6 is disposed at the shaft assembly 3 and does not occupy any space at either the first body 1 or the second body 2, the space impact of the camera 6 on other components such as the screen is minimized.

Figure 1:
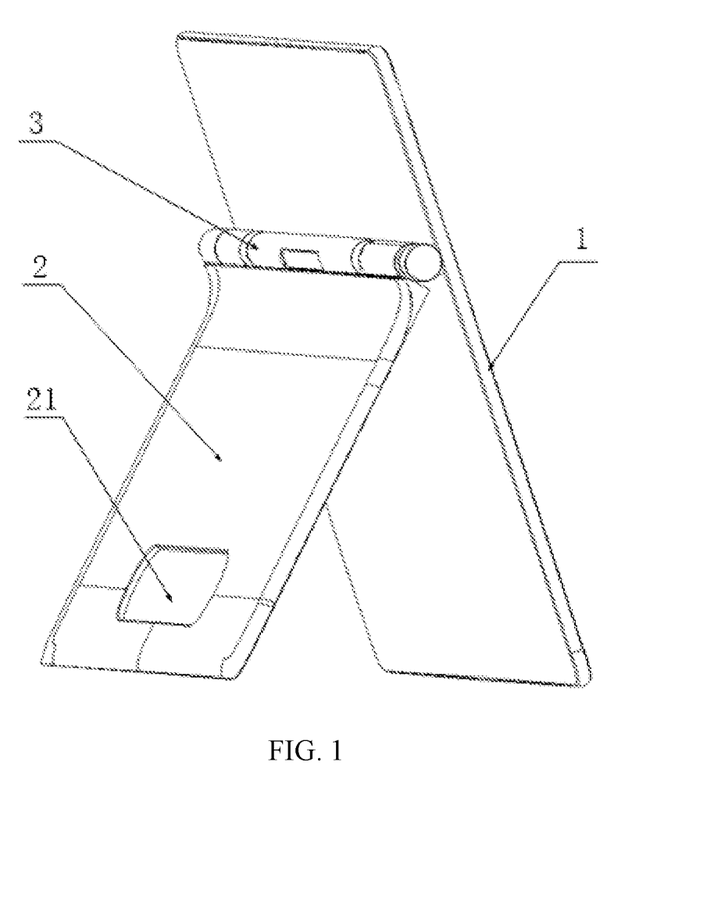
FIG. 1 is a schematic diagram of an electronic device after a second body thereof is opened relative to a first body thereof according to some embodiments of the present disclosure.
Figure 2:
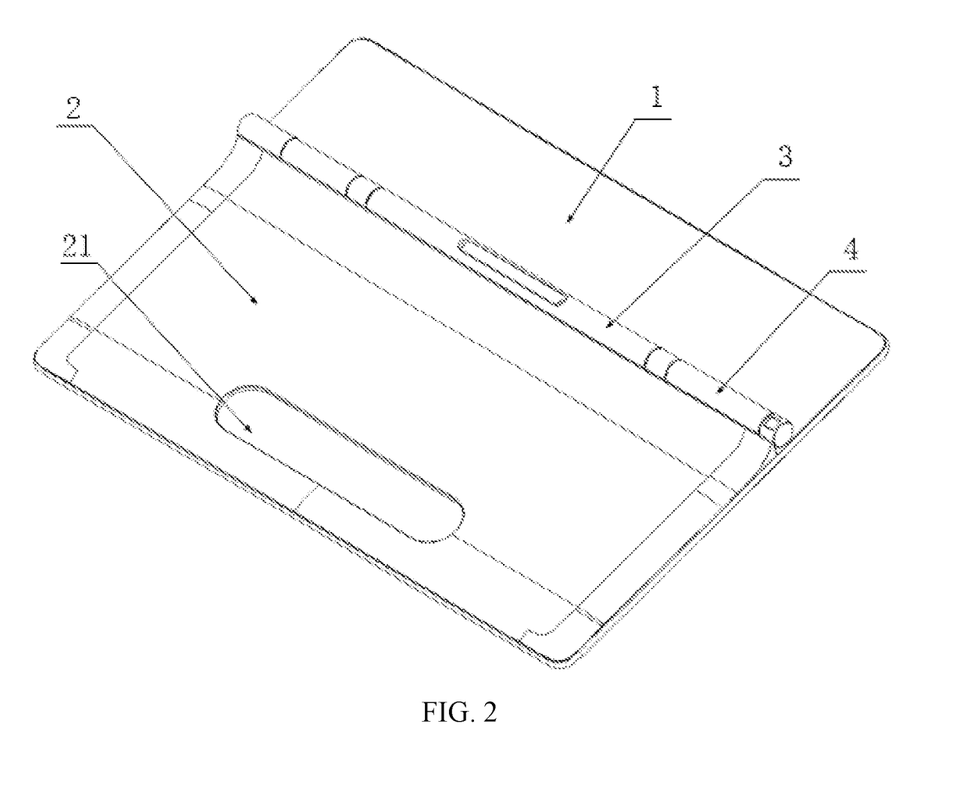
FIG. 2 is a schematic diagram of an electronic device after a second body thereof is closed relative to a first body thereof according to some embodiments of the present disclosure.
Figure 3:
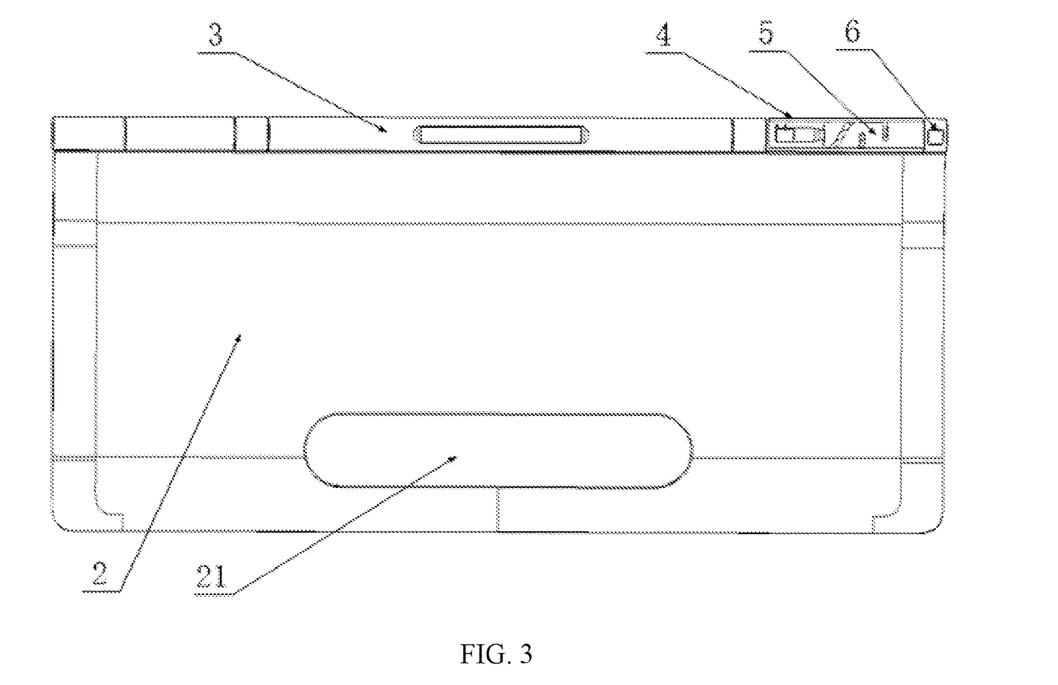
FIG. 3 is a schematic diagram showing the second body, the shaft assembly, and an internal structure of the cylinder in FIG. 2.

In some embodiments, the first body 1 is a host system of the electronic device, and the second body 2 is a support body of the host system. As shown in FIG. 1 and FIG. 2, a display screen is disposed at the front of the first body 1. The shaft assembly 3 is disposed at the back of the first body 1. Electronic components such as a motherboard of the electronic device are disposed inside the first body 1. The second body 2 is connected to the back of the first body 1 through the shaft assembly 3, and is capable of rotating to open and close relative to the first body 1. When the second body 2 rotates to open at a certain angle relative to the first body 1, the second body 2 and the first body 1 together form a herringbone support structure. As shown in FIG. 1, the electronic device in this configuration is able to stand on a desktop. When the second body 2 rotates relative to the first body 1 to close on the back of the first body 1, the second body 2 is stacked upon the first body 1. As shown in FIG. 2, the second body 2 and the first body 1 together roughly form a flat shape. In this configuration, a user using the electronic device can conveniently place the electronic device flat on a support structure such as a desktop or a knee. To facilitate conveniently opening the electronic device even when the first body 1 and the second body 2 are back-to-back stacked, the second body 2 is provided with a hollow area 21, such that when the second body 2 needs to be opened, the user can place a finger in the hollow area 21 to open the second body 2 and the first body 1. In addition, in addition to being the support body of the host system, the second body 2 may also accommodate certain functional modules to enhance the function of the second body 2. For example, another display screen may be disposed at the second body 2 as a secondary display screen, or an audio output module may be disposed at the second body 2.

In some other embodiments, the electronic device may be a foldable device. For example, the second body 2 and the first body 1 are both plate-shaped. One side of the second body 2 is connected to a side of the first body 1 through the shaft assembly 3. The electronic device includes a flexible display. The first part of the flexible display is supported by the front of the first body 1, and the second part of the flexible display is supported by the front of the second body 2. The second body 2 can rotate relative to the first body 1 within a range of 0°~180°, such that the flexible display can be flattened or folded.

As shown in FIG. 1, the first body 1 has a first face and a second face opposite to each other. A display screen is disposed at the first face (that is, the face facing away from the second body 2). In some embodiments, the shaft assembly 3 is disposed at an upper middle part of the second face, thereby facilitating the second body 2 to provide more stable support for the first body 1. In some other embodiments, the shaft assembly 3 may also be disposed at other part of the second face, for example, a top edge of the first body 1.

In some embodiments, the lens 61 of the camera 6 faces toward different directions respectively in the first configuration and the second configuration. That is, the lens 61 faces toward a first direction in the first configuration, and faces toward a second direction different from the first direction in the second configuration. In other words, when switching between the first configuration and the second configuration, the camera 6 not only moves a certain distance relative to the shaft body of the shaft assembly 3 in an axial direction, but also rotates by a certain angle in a circumferential direction relative to the shaft body. As such, the electronic device may be used with the camera 6 capable of shooting in different directions, thereby providing convenience for users in various scenarios. For example, the first direction is opposite to the second direction. That is, an angle of about 180° may be formed between the first direction and the second direction, such that the same camera 6 can provide a front-camera function and a rear-camera function. For example, a light-transmission window is provided at a side of the shaft body facing away from the first face of the first body 1. In the first configuration, that is, when the camera 6 is retracted into the shaft body, the lens 61 faces the light-transmission window, thereby satisfying the need of the rear-camera function.

When it is needed to provide the front-camera function, the camera 6 switches from the first configuration to the second configuration, the lens 61 protrudes from the axial end of the shaft assembly 3 and rotates toward the first face of the first body 1. At this point, the protruded camera 6 extends beyond the edge of the first face. That is, the first body 1 does not block the lens 61, thereby satisfying the need of the front-camera function.

In some embodiments, the first direction is opposite to the second direction, and the camera head 6 switches from the first configuration to the second configuration and rotates by about 180° in the circumferential direction relative to the shaft body. In some other embodiments, the camera head 6 switches from the first configuration to the second configuration and rotates by other angles, such as 270°, in the circumferential direction relative to the shaft body. In addition, the camera 6 may stop moving at any moment during the process of switching from the first configuration to the second configuration. That is, the camera 6 has a third configuration during the process pf switching from the first configuration to the second configuration. As such, when the camera 6 switches from the first configuration to the second configuration and rotates by an angle greater than 180° in the circumferential direction relative to the shaft body, the camera 6 may be configured to stop when the rotation angle reaches 180°, thereby achieving the front-camera function and the rear-camera function.

In some embodiments, the camera 6 is made to flush with an end surface of the shaft body in the first configuration. That is, when the camera 6 switches back to the first configuration from the second configuration, the camera 6 retracts into the shaft body, and no step structure is formed between an exposed surface of the camera 6 facing toward the axial direction of the shaft body and the end surface of the shaft body. Thus, the surface of the shaft assembly 3 appears neater and more beautiful after the camera 6 is retracted, and it also has better hand touch feel when the user's finger touches the end surface of the shaft assembly 3.

The shaft assembly 3 has two shaft ends arranged opposite to each other, and each of the two shaft ends may be provided with the camera 6. That is, there are two cameras 6 located at the two ends of the shaft body respectively. Arranging two cameras 6 enhances the functionality of the electronic device, for example, turning on both cameras 6 at the same time for holographic projection or shooting, and performing three-dimensional (3D) video shooting using both cameras 6.

As shown in FIGS. 3-12, to facilitate the camera 6 to switch between the first configuration and the second configuration, the shaft body includes a cylinder 4, and the cylinder 4 is sleeved on the rod 5. The camera 6 is disposed at a first end of the rod 5. A first guide slot is configured at an outer surface of the rod 5, and a first protrusion 41 is configured at an inner surface of the cylinder 4 to slidably couple with the first guide slot. The first guide slot includes a straight-line segment parallel to the axis of the rod 5 and an arc-line segment extending from an end of the straight-line segment. The axis of the rod 5 is perpendicular to a plane where the arc-line segment is located. That is, the straight-line segment of the first guide slot is parallel or substantially parallel to the axis of the rod 5, and the arc-line segment of the first guide slot extends substantially in a circumference direction of the rod 5 starting from the end of the straight-line segment. The cylinder 4 is fixedly arranged relative to the shaft body. When the rod 5 moves relative to the shaft body, the first protrusion 41 changes position relative to the rod 5 along the first guide slot. When the first protrusion 41 moves within the arc-line segment of the first guide slot, the rod 5 rotates relative to the cylinder 4. That is, the rod 5 rotates relative to the cylinder 4 in the circumference direction of the cylinder 4. At this point, an orientation of the lens 61 of the camera 6 changes. When the first protrusion 41 moves within the straight-line segment of the first guide slot, the rod 5 moves relative to the cylinder 4. That is, the rod 5 moves relative to the cylinder 4 in axial direction of the cylinder 4. At this point, the camera 6 extends outward or retracts inward. In other words, when the camera 6 switches between the first configuration and the second configuration, a movement of the camera 6 relative to the shaft body includes not only a translational movement of extending or retracting, but also a rotational movement around the axis of the shaft assembly 3. In some other embodiments, the movement of the camera 6 relative to the shaft body may only include the translational movement and not the rotational movement. But in this case, the orientation of the lens 61 of the camera 6 does not change through switching the configurations.

A distance that the rod 5 can move axially relative to the cylinder 4 is determined by a length of the straight-line segment of the first guide slot, and a distance that the rod 5 can rotate circumferentially relative to the cylinder 4 is determined by a length of the arc-line section of the first guide slot. The length of the straight-line segment and the length of the arc-line segment may be configured according to actual needs. Moreover, a total length of the arc-line segment may be allocated to two ends of the straight-line segment. That is, extension from two ends of the straight-line segment forms two arc-line segments. For example, a rotational distance may be evenly or unevenly divided between the two arc-line segments located at the two ends of the straight-line segment. That is, the two arc-line segments located at two ends of the straight-line segment may be configured to have an equal length or unequal lengths. For example, when the camera 6 switches from the first configuration to the second configuration, the rotational distance of the rod 5 relative to the cylinder 4 is 180°. So the lengths of the two arc-line segments at the two ends of the straight-line segment may be equal, each rotating a 90° rotational distance. Or, the two arc-line segments at the two ends of the straight-line segment may have unequal lengths. One of the two arc-line segments rotates a 60° rotational distance, and the other arc-line segment rotates a 120° rotational distance.

Figure 4:
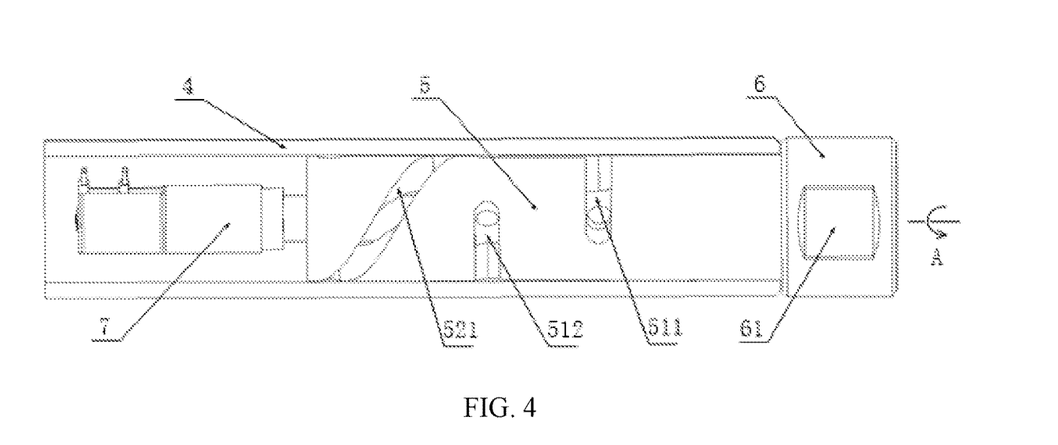
FIG. 4 is a schematic enlarged view of a section around the rod in FIG. 3.
Figure 5:
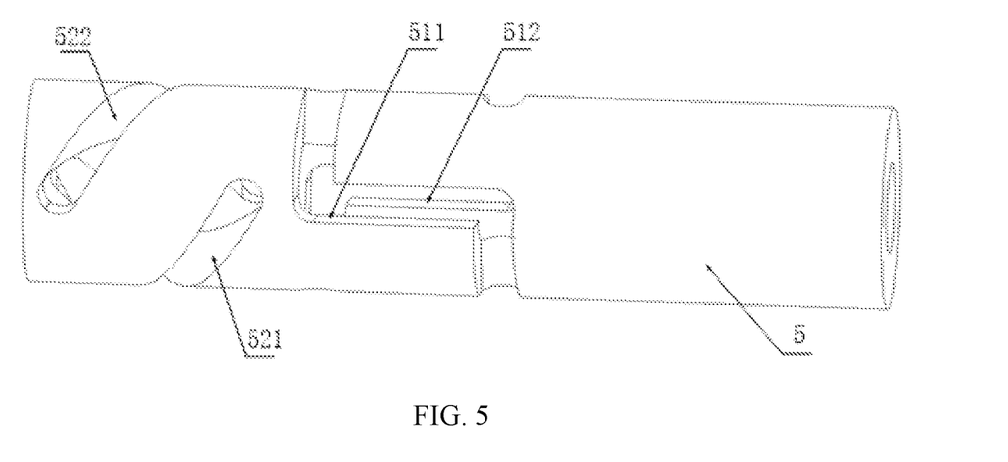
FIG. 5 is a schematic structural diagram of the rod in FIG. 4.
Figure 6:
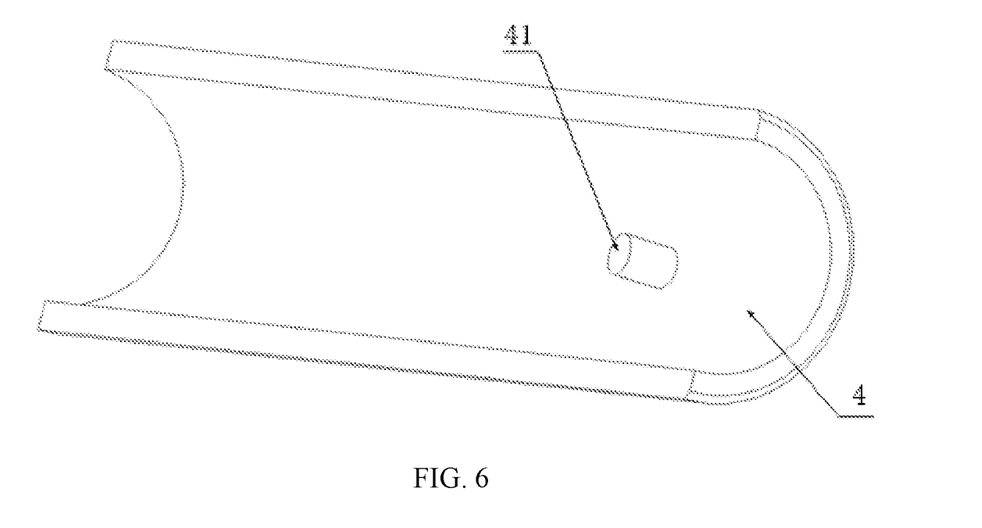
FIG. 6 is a schematic diagram showing the internal structure of the cylinder in FIG. 4.
Figure 8:
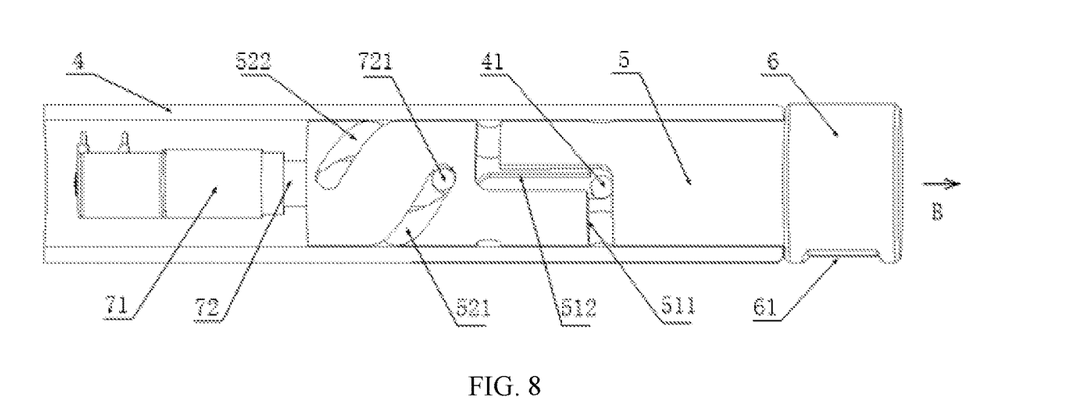
FIG. 8 is a schematic view of the rod in FIG. 4 after rotating in a direction indicated by arrow A.
Figure 9:
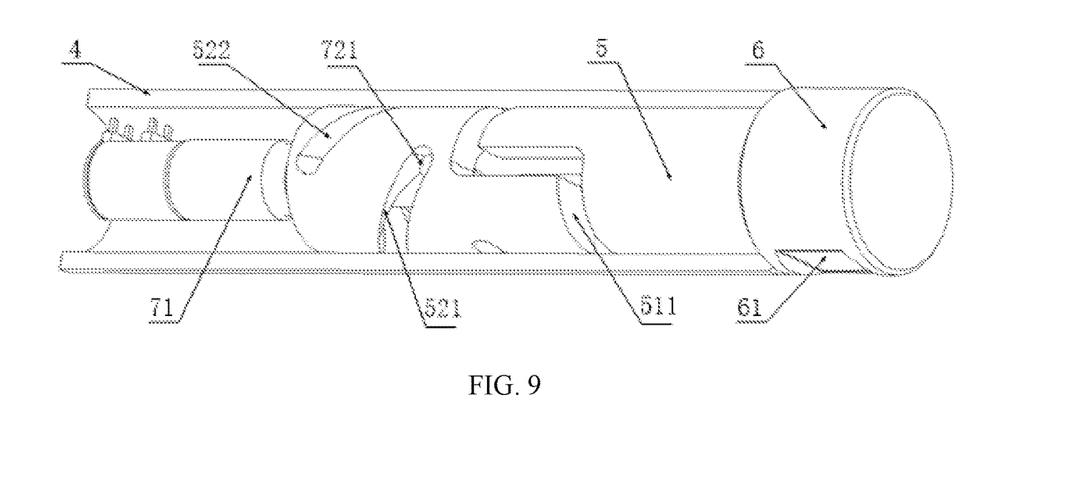
FIG. 9 is a schematic view of the structure in FIG. 8 from a different perspective.
Figure 10:
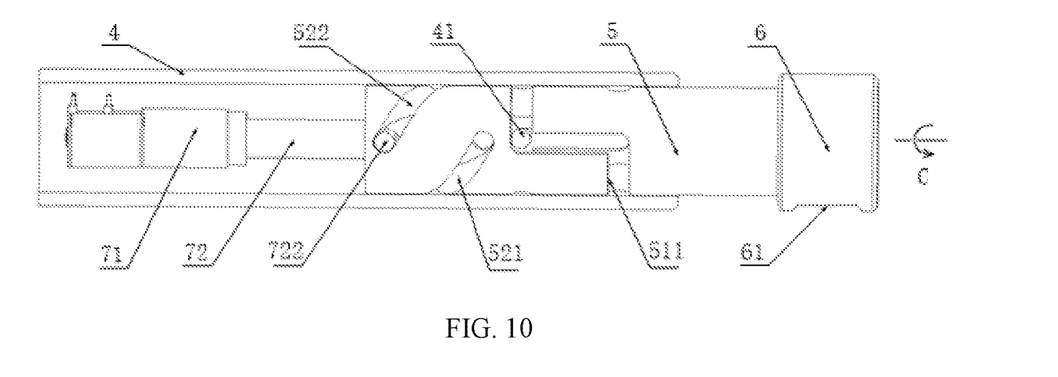
FIG. 10 is a schematic view of the rod in FIG. 8 after being moved in a direction indicated by arrow B.
Figure 11:
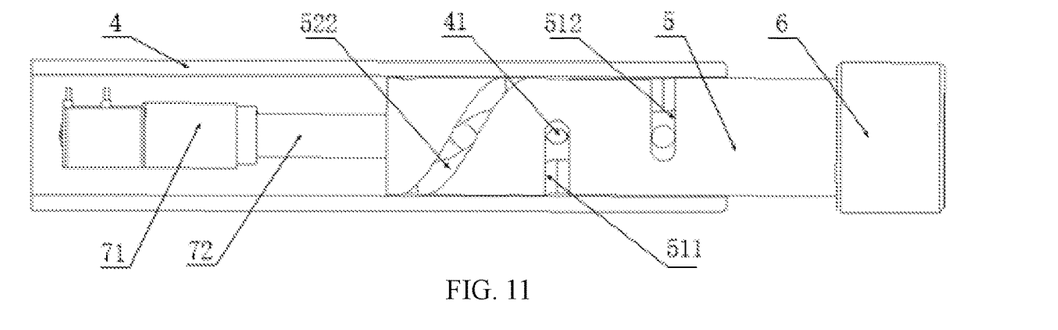
FIG. 11 is a schematic view of the rod in FIG. 10 after rotating in a direction indicated by arrow C.
Figure 12:
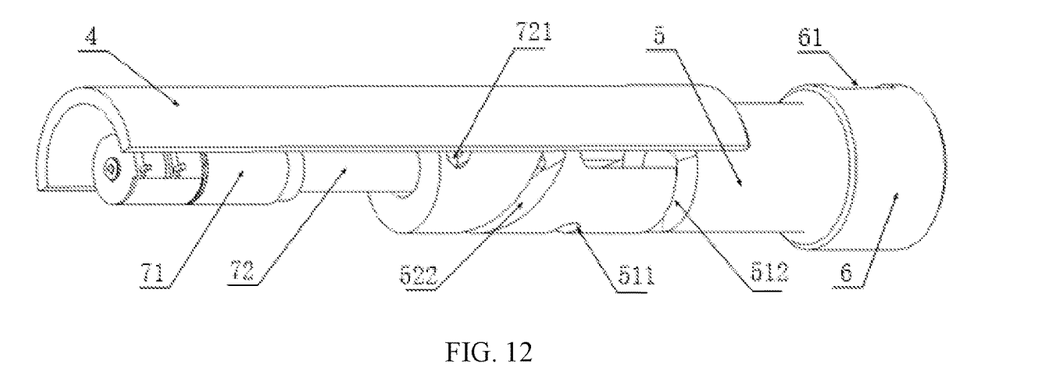
FIG. 12 is a schematic view of the structure in FIG. 11 from a different perspective.

In some embodiments, two or more first guide slots may be evenly distributed around the axis of the rod 5, thereby making the movement of the rod 5 more smoothly. As shown in FIG. 5, the rod 5 includes a first guide slot a 511 and a first guide slot b 512. FIG. 6 shows a cross-sectional view of the internal structure of the cylinder 4 along a longitudinal direction. In the other half of the cylinder 4 not shown in FIG. 6, another first protrusion 41 is similarly configured. The two first protrusions 41 slidably couple with the first guide slot a 511 and the first guide slot b 512, respectively. During the movement shown in FIG. 4, FIG. 8, FIG. 10, and FIG. 11, the first protrusion 41 is shown to be located in the first guide slot b 512. FIG. 4 shows the position of the camera 6 in the first configuration. FIG. 11 shows the position of the camera 6 in the second configuration. FIG. 8 and FIG. 10 show the positions of the camera 6 in the process of switching from the first configuration to the second configuration. As shown in FIG. 4 and FIG. 12, in the first configuration, the lens 61 of the camera 6 faces toward a normal positive direction of the longitudinal section of the cylinder 4, and in the second configuration, the lens 61 of the camera 6 faces toward a normal negative direction of the longitudinal section of the cylinder 4. That is, the camera 6 rotates 180° around the axis of the cylinder 4 from the first configuration to the second configuration. In some embodiments, the lengths of the two arc-line segments at the two ends of the straight-line segment of the first guide slot are equal. Thus, the camera 6 rotates 90° along a direction indicated by arrow A in FIG. 4 from the position shown in FIG. 4 to the position shown in FIG. 8, the camera 6 rotates 90° along a direction indicated by arrow C in FIG. 10 from the position shown in FIG. 10 to the position shown in FIG. 11, and the camera 6 moves without rotation along a direction indicated by B direction in FIG. 8 from the position shown in FIG. 8 to the position shown in FIG. 10.

To make the movement of the camera 6 of extending out of and retracting into the shaft body more smoothly, a cylindrical cavity extending in the axial direction is configured at the second end of the rod 5. A second guide slot is configured on an inner surface of the cylindrical cavity to extend helically around the axis of the rod 5. A drive shaft 72 is configured in the cylindrical cavity. A second protrusion is configured on an outer surface of the drive shaft 72 to slidably couple with the second guide slot. The drive shaft 72 is rotatably arranged on the shaft assembly 3, and rotates around the axis of the cylinder 4. When the drive shaft 72 rotates, the second protrusion on the drive shaft 72 is pushed against a guide surface of the second guide slot to apply a driving force on the rod 5. Because the second guide slot extends helically around the axis of the rod 5, when the first protrusion 41 is located in the straight-line segment of the first guide slot and restricts the rotation of the rod 5, the rod 5 moves axially along the cylinder 4 driven by the rotating drive shaft 72. When the first projection 41 is located in the arc-line segment of the first guide slot and no longer restricts the rotation of the rod 5, the rod 5 rotates with the rotating drive shaft 72. The drive shaft 72 rotates in opposite directions when the camera 6 extends and retracts. That is, the drive shaft 72 rotates in a reverse direction to retract the extended camera 6.

Figure 7:
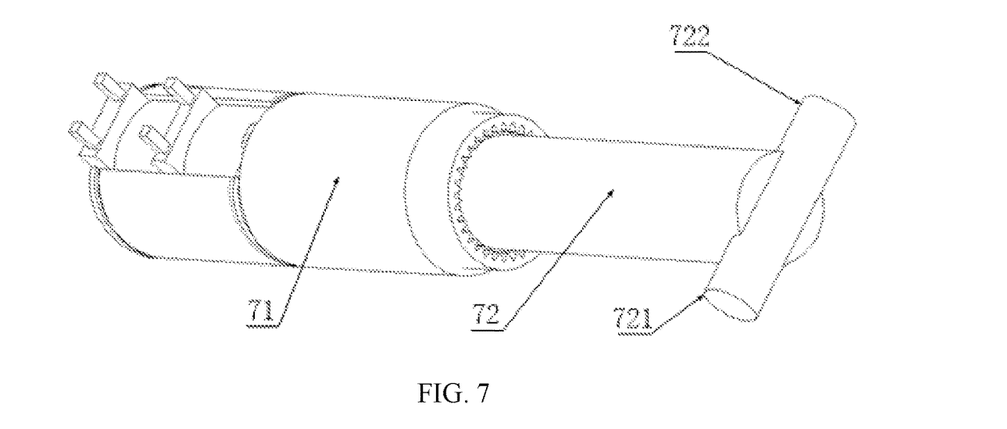
FIG. 7 is a schematic structural diagram of the drive assembly in FIG. 4.

In some embodiments, two or more second guide slots are evenly distributed around the axis of the rod 5, thereby making the movement of the rod 5 more smoothly. As shown in FIG. 5, the rod 5 includes two second guide slots, which are respectively a second guide slot a 521 and a second guide slot b 522. Correspondingly, the drive shaft 72 includes two second protrusions. As shown in FIG. 7, they are respectively a second protrusion a 721 and a second protrusion b 722, which are arranged symmetrically, that is, 180° apart. As shown in FIG. 8, the first protrusion b 41 is located in the first guide slot b 512. As shown in FIG. 10, the second protrusion b 722 is located in the second guide slot b 522. The rotation angle from the first end to the second end of the second guide slot should not be less than a total rotation angle corresponding to the arc-line segment of the first guide slot. For example, the total rotation angle corresponding to the arc-line segment of the first guide slot is 180°. Thus, the rotation angle from the first end to the second end of the second guide slot may be configured to be as 180°. In addition, the relative position of the second guide slot and the first guide slot may be configured as required. As shown in FIG. 8, the second guide slot is configured at a side of the first guide slot facing away from the camera 6. In some other embodiments, the second guide slot may be configured at a side of the first guide slot adjacent to the camera 6. Further, as shown in FIG. 8, the end of the first guide slot adjacent to the first guide slot starts at a position opposite to the straight-line segment of the first guide slot in the axial direction. In some other embodiments, the end of the first guide slot adjacent to the first guide slot may start at another position, for example, at a position opposite to the middle of the arc-line segment of the first guide slot in the axial direction.

The power source of the drive shaft 72 has multiple options. In some embodiments, the drive assembly 7 includes an electric motor 71. The electric motor 71 is fixedly arranged with respect to the shaft body of the shaft assembly 3. The drive shaft 72 is driven by an output shaft of the electric motor 71 to rotate. In some other embodiments, the second body 2 may be connected to the drive shaft 72 through a transmission. When the second body 2 rotates relative to the first body 1, the moving second body 2 can drive the drive shaft 72 to rotate relative to the shaft body. When the electric motor 71 is used as the power source of the drive shaft 72, the electric motor 71 may be started and shut down in various ways. For example, a physical button or a virtual button may be configured to control the electric motor 71, and virtual buttons can also be set to control the motor 71. The electronic device may also be provided with a voice recognition module to control the electric motor 71 through voice.

In the embodiments of the present disclosure, the first body rotates relative to the second body through the connection of the shaft assembly. The camera is provided movably in the shaft body of the shaft assembly. The axis of the lens of the camera is perpendicular to the axis of the shaft body. The camera switches between the first configuration and the second configuration by moving relative to the shaft body. When switching from the first configuration to the second configuration, the camera extends from the axial end of the shaft body, such that the lens is located outside the shaft body. When switching from the second configuration to the first configuration, the camera retracts into the shaft body. That is, the camera arranged at the shaft connecting the first body and the second body extends and retracts from one end of the shaft. When the camera extends, the lens is located outside the shaft body, thereby satisfying the shooting requirement. Further, because the camera is provided at the shaft assembly without occupying the first body or the second body, the space impact on other components such as the display screen can be minimized. For example, the display screen of the electronic device includes smaller bezels. The layout of the camera of the electronic device provided by the present disclosure is efficient, thereby reducing the space impact of the camera on other components such as the display screen.

In this specification, the structure of each part is described in a progressive manner. The description of the structure of each part focuses on the difference from the existing structure. The overall and partial structure of the electronic device can be realized by combining the structures of the above parts.

The above description of the disclosed embodiments is provided to enable any person skilled in the art to make or use the present application. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to be accorded the broadest scope consistent with the principles and novel features disclosed herein.

What is claimed is:

1. An electronic device comprising:
   a first body;
   a shaft assembly disposed at the first body and including a shaft body;
   a second body connected to the first body through the shaft assembly and configured to rotate relative to the first body; and
   a camera movably disposed inside the shaft body;
   wherein:
      an axis of a lens of the camera and an axis shaft body satisfy a perpendicular condition;
      the camera is configured to move relative to the shaft body to switch between:
         a first configuration in which the camera is retracted in the shaft body, and
         a second configuration in which the camera extends from an axial end of the shaft body and the lens is located outside the shaft body;
      the shaft body includes a cylinder sleeved on a rod;
      the camera is disposed at an end of the rod;
      a guide slot is provided at an outer surface of the rod;
      a protrusion is provided at an inner surface of the cylinder to slidably couple with the guide slot;
      the guide slot includes a straight-line segment parallel to an axis of the rod and an arc-line segment extending from an end of the straight-line segment; and
      the axis of the rod and a plane where the arc-line segment is located satisfy a perpendicular condition.

2. The electronic device according to claim 1, wherein:
   in the first configuration, the lens faces toward a first direction; and
   in the second configuration, the lens faces toward a second direction different from the first direction.

3. The electronic device according to claim 2, wherein the first direction and the second direction are opposite to each other.

4. The electronic device according to claim 3, wherein:
   the first body includes a first face and a second face opposite to each other;
   a display screen is disposed at the first face; and
   the shaft assembly is disposed at an upper middle part of the second face.

5. The electronic device according to claim 1, wherein in the first configuration, the camera is flush with an end surface of the shaft body.

6. The electronic device according to claim 1, wherein the arc-line segment is one of two arc-line segments extending from two ends of the straight-line segment, respectively.

7. The electronic device according to claim 6, wherein:
   the end of the rod is a first end of the rod, the guide slot is a first guide slot, and the protrusion is a first protrusion;
   a cylindrical cavity extending in an axial direction of the rod is configured at a second end of the rod;
   a second guide slot is configured on an inner surface of the cylindrical cavity to extend helically around the axis of the rod;
   a drive shaft is provided in the cylindrical cavity; and
   a second protrusion is configured on an outer surface of the drive shaft to slidably couple with the second guide slot.

8. The electronic device according to claim 7, wherein the first guide slot is one of two or more first guide slots that are evenly distributed around the axis of the rod.

9. The electronic device according to claim 7, wherein the second guide slot is one of two or more second guide slots that are evenly distributed around the axis of the rod.

\* \* \* \* \*